UNITED STATES PATENT OFFICE.

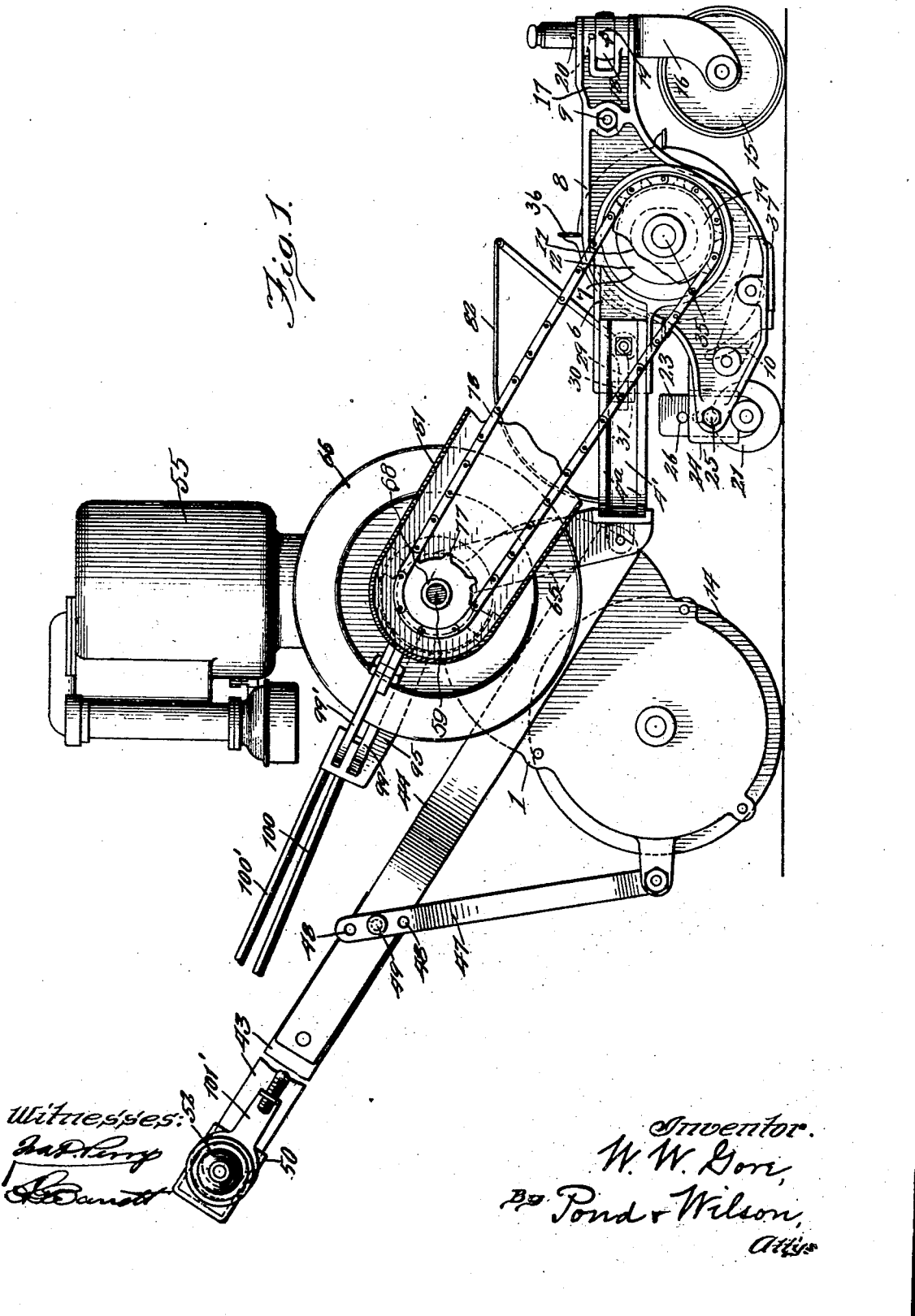

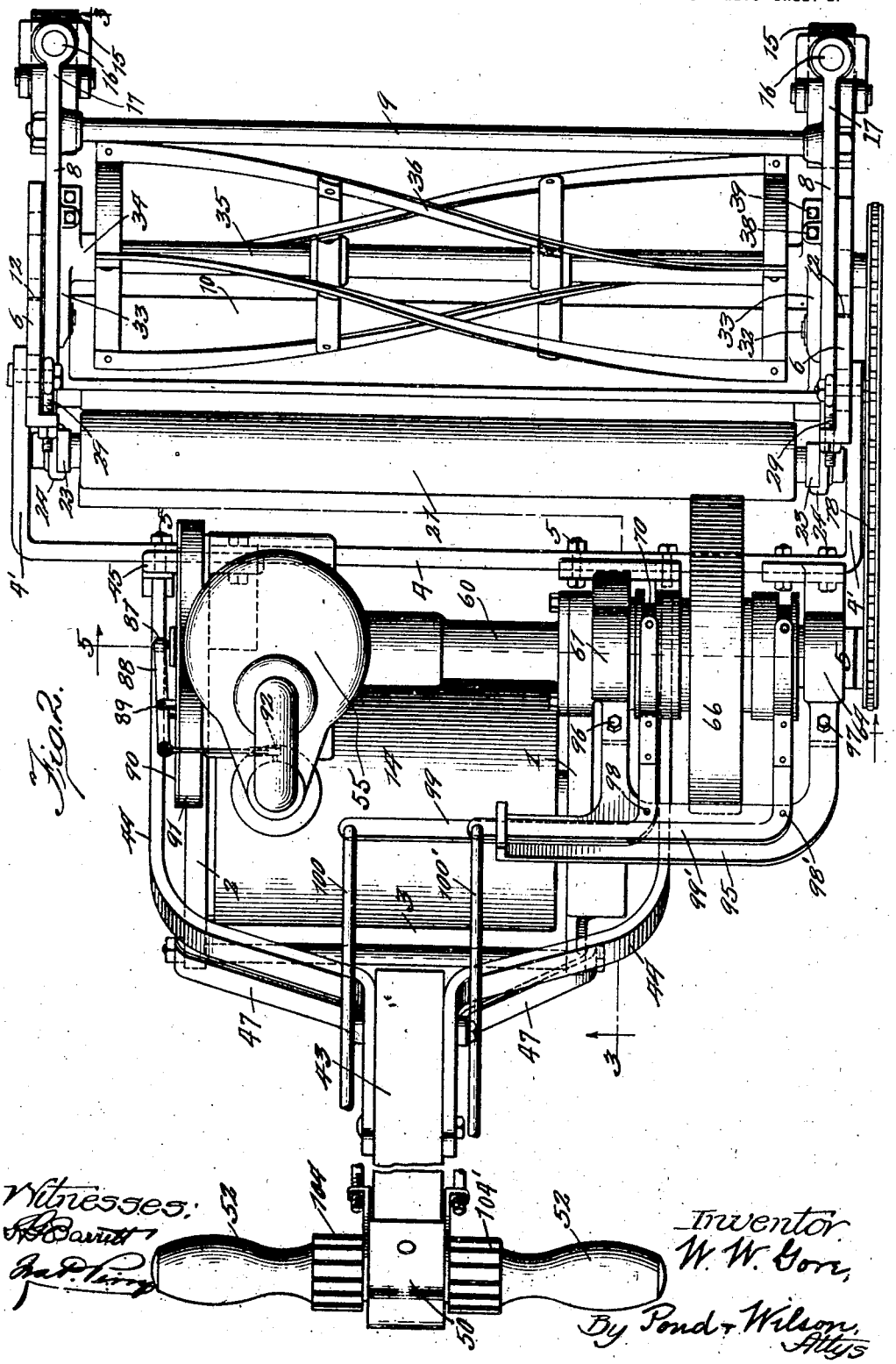

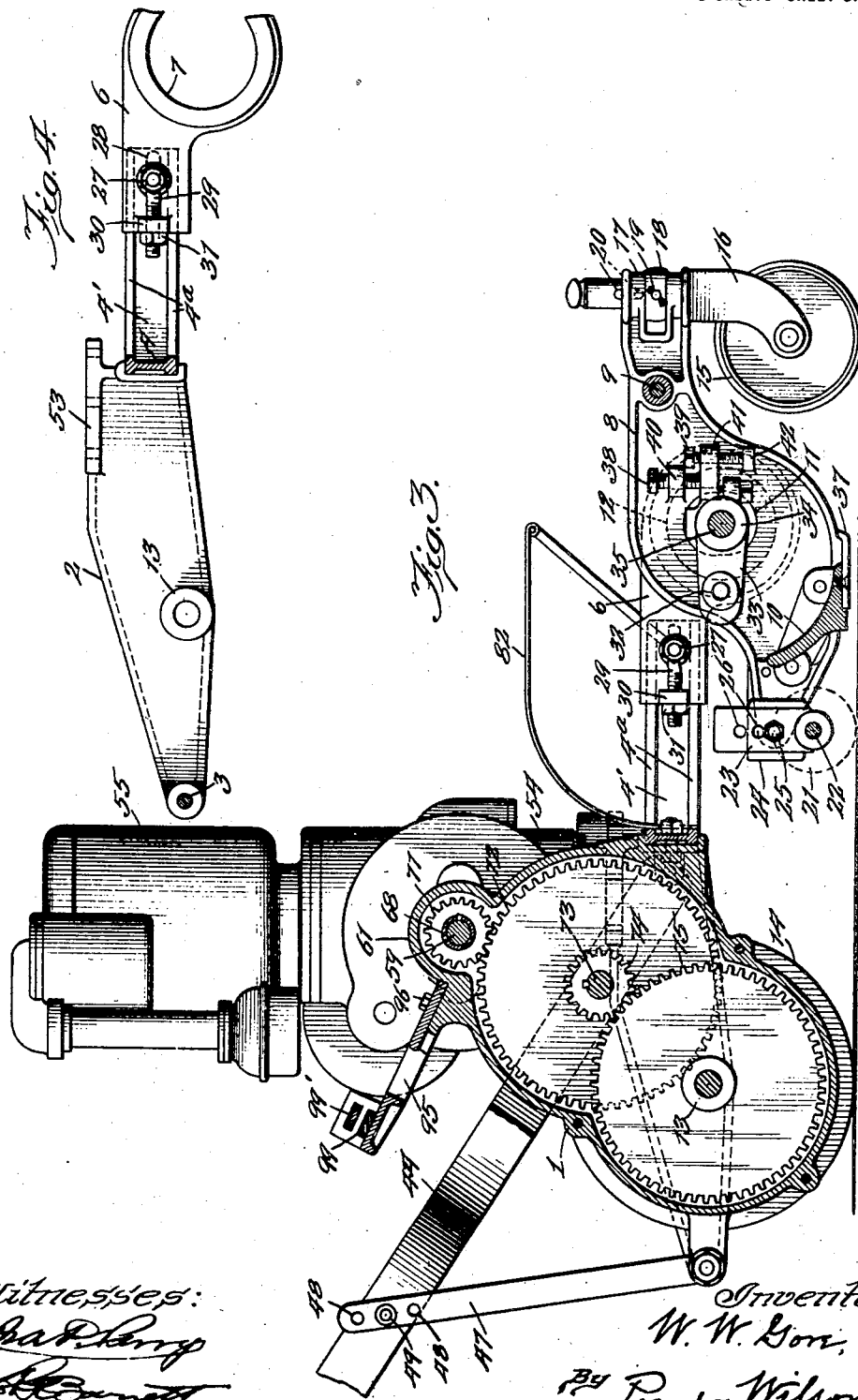

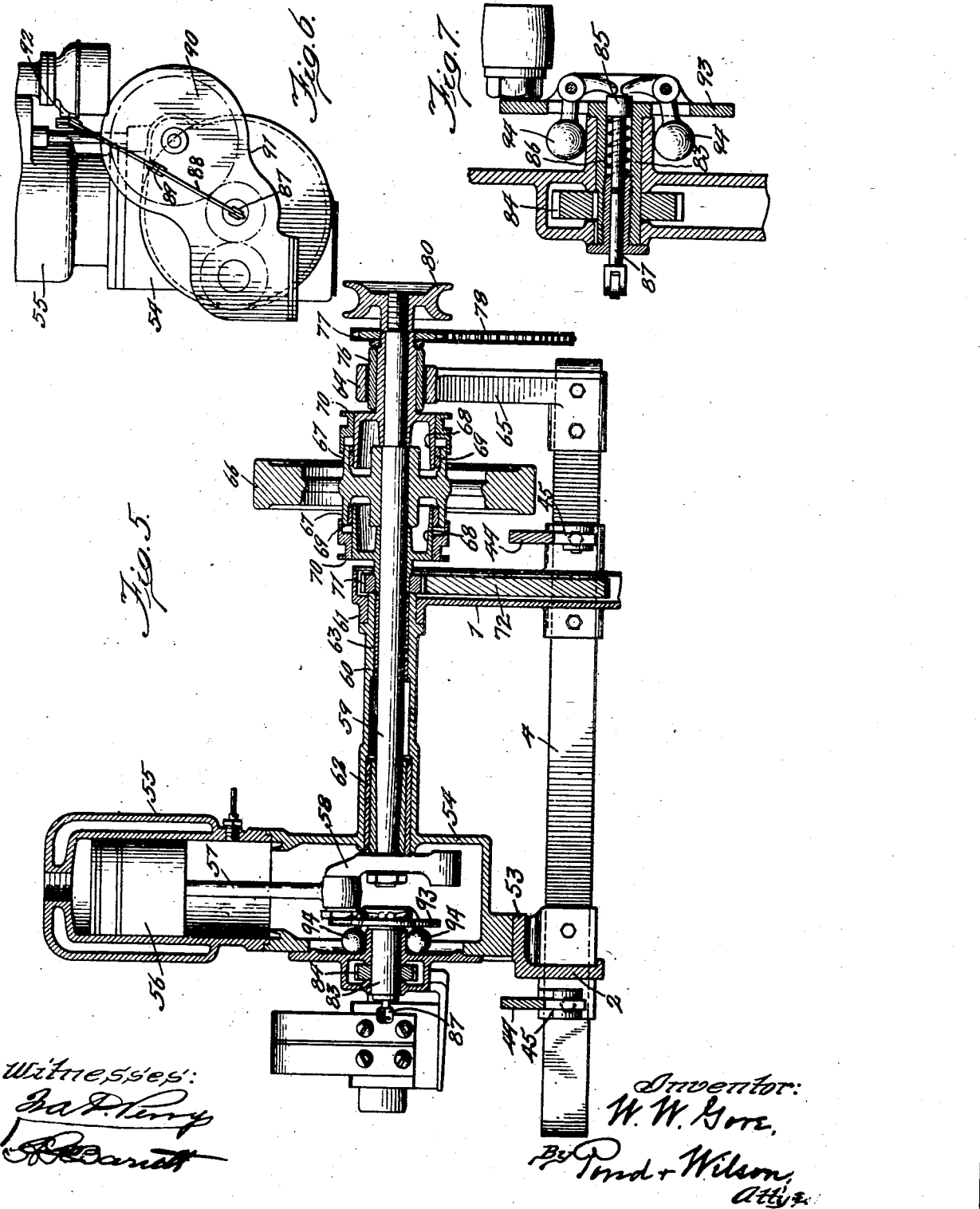

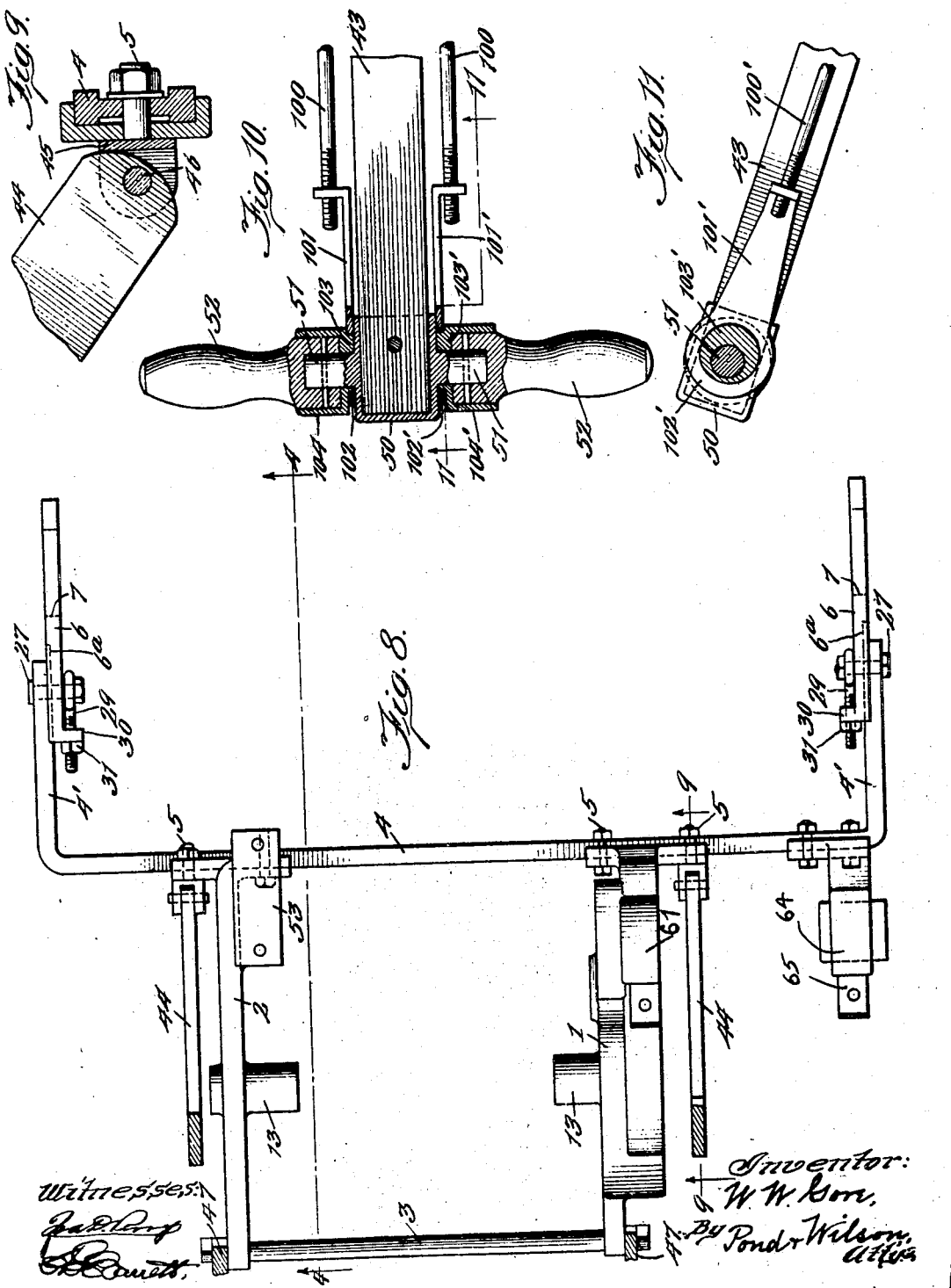

WARREN W. GORE, OF MADISON, WISCONSIN, ASSIGNOR TO FULLER & JOHNSON MFG. CO., OF MADISON, WISCONSIN, A CORPORATION OF WISCONSIN.

POWER LAWN-MOWER.

1,240,561.   Specification of Letters Patent.   Patented Sept. 18, 1917.

Application filed July 13, 1915. Serial No. 39,596.

*To all whom it may concern:*

Be it known that I, WARREN W. GORE, a citizen of the United States, residing at Madison, in the county of Dane and State of Wisconsin, have invented certain new and useful Improvements in Power Lawn-Mowers, of which the following is a specification.

This invention relates to power lawn mowers of that general type which are adapted to be guided and controlled by the operator walking behind the machine, the traction and cutting operations being performed by a motor mounted on the machine. Numerous makes of machines of this general class are now on the market, but, as far as I am aware, as thus far developed they are all so heavy, cumbersome, and inflexible as to make them impracticable in many situations where manual manipulation may be required to extricate the machine from an inoperative situation or to enable the machine to operate close up to trees or bushes or in other spots more or less difficult of access.

With a view to remedying this defect in this type of lawn mower and rendering the same a more perfect and complete substitute for the ordinary hand mover under all the conditions of service of the latter, I have produced the present invention, the primary object had in view being to provide a very flexible machine of such light weight and easy running qualities that the manual effort of the operator may be employed to draw it backwardly, when necessary, without reversing the motor, to raise it out of ruts or push it over slippery spots where the traction of the motor may be ineffective, or to otherwise manipulate the machine in situations where power operation is impracticable or impossible.

Another object of the invention is to provide an improved power lawn mower of that specific type in which the traction roller and the cutter are both power-driven but are each independent of the operation of the other and wherein either or both may be disconnected from the motor at the will of the operator.

Another object of the invention is to produce a power lawn mower of this type wherein a substantially constant and uniform speed of operation under varying work conditions may be obtained automatically and without attention on the part of the operator while running the machine, this being accomplished through the agency of an automatic feed control device or governor on the motor.

Another object of the invention is to provide, in a mower of this type, an improved mechanism for actuating the clutches which connect the motor shaft to the traction roller and cutter reel driving mechanisms from the immediate vicinity of the handle grips and without requiring the operator to intermit his steering control of the machine in order to operate such clutch-actuating mechanism.

A further object of the invention is to provide a power lawn mower of very simple construction and low cost of manufacture, not liable to get out of order, and that shall be capable of doing the work of the ordinary hand mower in practically all the situations and under all the conditions in which the hand mower is now used.

Still other purposes and advantages of the invention will be apparent to those familiar with this art as the same becomes better understood from the subjoined detail description and by reference to the accompanying drawings, in which latter I have illustrated a practical and preferred embodiment of the invention and wherein—

Figure 1 is a side elevation, partly broken out, of my improved power lawn mower;

Fig. 2 is a top plan view of the same;

Fig. 3 is a vertical longitudinal section taken on the line 3—3 of Fig. 2;

Fig. 4 is a sectional detail of the frame construction taken on the line 4—4 of Fig. 8;

Fig. 5 is a vertical section through and lengthwise of the engine shaft, taken on the line 5—5 of Fig. 2;

Fig. 6 is a detail elevation showing the lower portion of the engine cylinder and the crank-case and a portion of the automatic fuel-feed control;

Fig. 7 is an enlarged sectional detail of parts of the automatic fuel-feed control appearing on the left-hand portion of Fig. 5;

Fig. 8 is a top plan view of the main frame structure and parts directly connected thereto;

Fig. 9 is an enlarged sectional detail on the line 9—9 of Fig. 8;

Fig. 10 is a detail top plan view, partly in section, of the outer end portion of the steering bar and the handle grips, and also showing the eccentrics for actuating the clutch operating mechanism;

Fig. 11 is a detail view partly in side elevation and partly in section on the line 11—11 of Fig. 10.

Referring to the drawings, Fig. 8 shows in top plan view the main frame structure that carries the motor and the journals of the traction roller, this frame structure comprising a pair of side members 1 and 2, a rear distance rod 3, and a bail-shaped forward frame member or yoke 4 secured to the side members 1 and 2 by bolts 5. The forward frame member 4 extends laterally some distance beyond the side frame members 1 and 2, and to its forwardly extending arms 4' are secured by an adjustable sliding joint connection a pair of frame connectors 6 in which are circular bearings 7 for forming a pivotal connection with the cutter frame. This latter, as best shown in Figs. 1 and 2, comprises a pair of side plates 8, a distance rod 9 connecting and spacing the forward ends of said side plates, and a cutter-bar supporting member 10 connecting and spacing the lower rear portion of said side plates 8. The side plates 8, as shown in Fig. 3, are formed with openings 11 therethrough to accommodate the passage and adjustment of the cutter reel shaft, and, on their outer sides, surrounding said openings, with circular bearing bosses 12 on which the frame connectors 6 are pivotally mounted by means of their journal bearings 7. The side bars 1 and 2 of the main frame carry journal bearings 13 to receive the axle of the traction roll 14, and the side frame member 1 is formed as a gear case, as clearly shown in Fig. 3, to house the gear train between the motor shaft and the traction roll. The cutter frame has roller supports for both its forward and rear ends, the forward supports consisting of caster wheels 15 journaled in yokes 16, the spindles of which are vertically journaled in forked bearing brackets 17 extending forwardly of and integral with the side plates 8 of the cutter frame. Where vertical adjustability of the cutter frame is desired, this may be conveniently secured by means of a collar 18 that is secured by a cross pin 19 to the spindle of the caster wheel yoke, extending through any of a series of spaced holes 20 in the latter, and this collar 18 lying within the forks of the bearing brackets 17. The roller support for the rear end of the cutter frame consists, as herein shown, of a ground roller 21, the spindle 22 of which is journaled in bearing blocks 23 mounted in vertical guides 24 formed on the rear ends of the side plates 8, said bearing blocks 23 being adjustably mounted in said guides by bolts 25 passing through holes in the guides and any of a series of vertically spaced holes 26 in the bearing blocks.

The sliding joint connection between the arms 4' of the main frame yoke 4 and the frame connectors 6 consists of a bolt 27 that extends through a hole in the arm 4' and through a longitudinal slot 28 (Fig. 4) in the overlapping end of the frame connector 6, and an eye-bolt 29 the head of which engages the bolt 27 while its threaded stem extends through a lateral lug 30 on the inner side of the rear end of the frame connector 6 and receives a tightening nut 31. Transverse rigidity of the joint is secured by a tongue and groove engagement of the overlapping parts, the outer side of the member 6 being formed with grooves or channels 6ª engaged by tongues or flanges 4ª on the member 4'. The main purpose of the longitudinal extensible joint last described, is to afford a simple and easy means of tightening a sprocket chain that forms part of the driving connection between the motor shaft and the cutter reel shaft, as hereinafter described. Obviously, where other chain tightening means are employed, or a cutter reel driving connection not requiring adjustment is employed, the frame connector members 6 may be formed as integral extensions of the frame members 4'.

To the inner sides of the side plates 8 of the cutter frame are pivoted at 32 arms 33 carrying journal bearings 34 for the shaft 35 of the cutter reel 36, said shaft 35 extending through the openings 11 in the side plates 8. These openings are for the purpose of permitting a limited degree of adjustment of the cutter reel bodily toward and from a stationary cutter bar 37 which latter, as shown in Figs. 1 and 3, is secured to and extends forwardly of the lower side of the rigid cutter bar support 10. The adjustment of the cutter reel shaft bearings 34 is effected by means of adjusting screws 38 and 39, the former of which is mounted in a tapped lug 40 (Fig. 3) on the inner face of the side plate 8 and at its lower end bears on a forward extension 41 of the arm 33, while the screw 39 engages a tapped hole in said extension 41 and abuts at its lower end on a lateral lug 42 on the inner face of the side plate 8. The screw 38 effects downward adjustment of the shaft bearing 34, while the screw 39 effects upward adjustment of the same.

43 designates the steering bar that is connected at its lower ends through hounds 44 to forked lugs 45 secured to the frame bar 4, as shown in detail in Fig. 9, the stem or shank of the lug 45 constituting one of the bolts 5 through which the frame bars 1 and 2 are secured to the frame bar 4. The lower ends of the hounds 44 are pivotally connected to the lugs 45 by pivot pins or bolts 46. 47 designates each of a pair of brace bars that connect the rear ends of the frame members 1 and 2 with the steering bar. As herein shown said brace bars 47 are provided with a plurality of holes 48 near their upper ends, through any one of which is passed a securing bolt 49 extending through the steering bar and the overlapping portions of the hounds, thereby providing for angular adjustment of the steering bar to accommodate the height of the operator. On the outer end of the steering bar 43 is a metal socket-piece 50, best shown in the detail views of Figs. 10 and 11, that is formed with lateral studs 51 on which are secured the handle grips 52.

On a base plate 53 that is formed integral with the inner upper portion of the frame member 2 is mounted the crank case 54 of an internal combustion engine, the cylinder of which is designated by 55. Referring more particularly to Fig. 5, 56 designates the piston of the engine, 57 the pitman, and 58 the crank, which latter is fast on the engine shaft 59. Integral with one side of the crank case 54 is an extended shaft sleeve or casing 60, the outer end of which fits within a bearing 61 formed on the upper end of the gear case frame member 1; and within the shaft casing 60 are bearing sleeves or bushings 62 and 63 that form journals for the engine shaft 59. The shaft 59 extends beyond the bearing 61 and near its outer end is additionally supported in a bearing 64 on the upper end of a bearing bracket 65 that is rigidly secured at its lower end to the frame member 4. Fast on the shaft 59 between the bearings 61 and 64 is the engine fly wheel 66, integral with the hub of which are laterally extending collars 67, each of which forms one member of an expansion ring clutch. 68 designates each of two cooperating clutch members that are loosely sleeved on the shaft 59. Between the lapping portions of the clutch members 67 and 68 is the expansion ring 69 that is pinned to the clutch member 68 and expanded into frictional engagement with the clutch member 67 by a wedge device (not shown) actuated by a follower sleeve 70. As this is an old and well known form of clutch and forms in itself no part of the present invention, and may be substituted by any other desired or preferred clutch, the same need not be herein further described.

Keyed to the outer end of the sleeve of one of the loose clutch members 68 is a spur pinion 71 that drives the traction roller 14 through an ordinary train of speed-reducing gears contained within the gear case 1 (Fig. 3) and comprising a gear 72 meshing with the pinion 71 and journaled on an intermediate stub shaft 73, a pinion 74 on the hub of the gear 72, and a gear 75 meshing with the pinion 74 and fast on the spindle or shaft of the traction roller 14.

The sleeve of the other loose clutch member 68 is journaled in a bearing sleeve or bushing 76 (Fig. 5) mounted in the bearing member 64 and fast on the outer end of said sleeve is a sprocket wheel 77 that is connected by a sprocket chain 78 (Fig. 1) with a sprocket wheel 79 fast on one end of the shaft 35 of the cutter reel. On the extreme outer end of the engine shaft 59 is secured a starting wheel 80 having a grooved periphery on which a rope or cord may be wound for effecting the cranking of the engine. 81 designates a chain guard for the sprocket chain 78 and wheels 77 and 79, and 82 designates a grass guard or shield suitably mounted above and in rear of the cutter reel and bar.

Referring to Figs. 5, 6 and 7, 83 designates a short section of the crank shaft that is journaled in the opposite side of the crank case from the shaft section 59 and actuates the timing gear of the engine, one element of which is shown at 84. As shown in Fig. 7, the shaft section 83 is hollow and has mounted therein a plunger 85 that is normally forced outwardly by a coil spring 86. The outer end of the plunger stem abuts against the inner end of a rod 87, the outer end of which is forked and is pivotally connected to the lower end of a lever 88 that is fulcrumed intermediate its ends at 89 (Fig. 6) on the cover plate 90 of the timing gear case 91 and, at its upper end, is suitably connected to the stem of the throttle valve 92 of the engine. On the crank disk 93 (Fig. 7) of the short shaft section 83 are pivoted a pair of centrifugal ball governor arms 94, the inner ends of which engage the head of the plunger 85. As the speed of the engine increases the expansion of the governor arms, acting through the plunger 85, rod 87, and lever 88, partially closes the throttle valve 92, reducing the fuel supply to the engine; and as the speed decreases a reverse action on the throttle valve is effected by the spring 86. The engine is thus automatic as to its speed control, thus relieving the operator of the task of manually regulating the fuel supply as the working conditions may change.

Describing now the means for controlling the clutches which transmit the power of the motor to the traction roller and cutter reel, 95 (Figs. 1 and 2) designates a clutch lever supporting bracket that is bolted at 96 and 97 to lug extensions of the bearing members 61 and 64. Pivoted at 98 to said bracket 95 is an elbow lever 99, one arm of which is forked to embrace the clutch follower 70 of the clutch that controls the traction roller. To the other arm of lever 99 is connected a link 100 that extends outwardly along one side of the steering bar 43 and at its upper end is connected to the lower end of an eccentric rod 101 (Fig. 10), which latter is formed integral with an eccentric strap 102 that embraces an eccentric 103 formed on the inner end of a ring or sleeve 104 that is rotatably mounted upon the inner end of the left handle grip 52 which sleeve preferably has a corrugated or knurled exterior surface as shown in Fig. 2 to facilitate turning of the same by the hand of the operator. Identically the same clutch operating mechanism is employed to actuate the clutch controlling the transmission of power to the cutter reel; 99' being the elbow lever pivoted to the bracket 95 at 98', 100' being the connecting link, 101' (Fig. 10) the eccentric rod, 102' the eccentric strap, 103' the eccentric, and 104' the ring or sleeve carrying the eccentric 103' and rotatably mounted on the inner end of the right handle grip 52.

The clutch operating mechanism last described, while not operated by any movement of the handle itself, can nevertheless be operated by the hand of the operator without requiring him to remove his hands from the handle grips, thus enabling him to maintain full steering or guiding control of the machine through the handle grips and steering bar while effecting the connecting and disconnecting of the motor to the parts driven thereby at will.

It is believed that the preceding description will afford a full understanding to those skilled in the art of not only the structural features but the mode of operation of my improved power lawn mower, and will make clear how the specified objects of the invention are attained therein. Heretofore, so far as I am aware, independence of rocking or vibrating movement between the main frame carrying the motor and the traction wheels or roller on the one hand and the cutter frame carrying the cutter mechanism on the other has been secured by connecting the two frames by pivot links or similar devices. It will be observed that in the above described machine the main frame and the cutter frame are flexibly connected on a single pivotal axis, and that this axis is substantially coincident with the axis of the cutter reel. This construction enables both the cutter frame and the main frame to accommodate themselves to irregularities in the contour of the ground, especially under longitudinal vibration, without disturbing the predetermined relation of the cutter mechanism to the surface of the ground. The machine of my invention is designed principally to be manufactured in substantially the standard existing sizes of hand mowers; and the construction is so simple and the entire machine of such relatively light weight that, as already stated, the machine can easily be manipulated manually whenever required or desired with no unusual or severe effort on the part of the operator. It will be noted that the front distance rod 9 of the cutter frame is set inwardly, close to the cutter reel, thus enabling the machine to cut close to trees, bushes and the like, and its light weight enables the motor to be disconnected from the traction roller so that the machine can be manually pushed and drawn back and forth in or around places difficult of access under power actuation.

In conclusion, I desire to emphasize the fact that the present machine does not belong to that class of machines known as combined lawn rollers and cutters, which latter are ordinarily made very heavy in order to produce a leveling or flattening effect on the surface of the ground and frequently are provided with a seat or platform to accommodate the operator, whose weight is thus added to that of the machine. My present machine is purely and simply a grass cutter, and the purpose or function of the traction roller 14 (which may be substituted by wheels if desired) is simply and solely to support the main frame and parts carried thereby and to afford sufficient traction on the ground to propel the cutter frame and cutting mechanism. While I have illustrated and described my invention in substantially the detail form and structure in which the same is now being manufactured for the market, I wish it to be understood that many of the details may be varied within the purview and scope of the invention as defined in the appended claims without involving any departure from the invention or sacrificing any of the advantages thereof.

I claim:

1. In a power lawn mower of the class described, the combination of a main frame, a traction roller journaled in said main frame, a cutter frame flexibly connected to the forward end of said main frame on a single pivotal axis, said traction roller and cutter frame affording the entire ground support for said main frame, roller supports for the front and rear ends of said cutter frame, a cutter in said cutter frame, a steering bar connected to said main frame, a motor on said main frame, and driving connections from said motor to said traction roller and cutter.

2. In a power lawn mower of the class described, the combination of a main frame, a traction roller journaled in said main frame, a cutter frame, a cutter in said cutter frame, said cutter frame being flexibly connected to the forward end of said main frame on a single pivotal axis that is substantially coincident with the axis of said cutter, and, with said traction roller, affording the entire ground support for said main frame, roller supports for the front and rear ends of said cutter frame, a steering bar connected to said main frame, a motor on said main frame, and driving connections from said motor to said traction roller and cutter.

3. In a power lawn mower of the class described, the combination of a main frame, a traction roller journaled in said main frame, a cutter frame, a cutter in said cutter frame, said cutter frame being flexibly connected to the forward end of said main frame on a single pivotal axis that is substantially coincident with the axis of said cutter, and, with said traction roller, affording the entire ground support for said main frame, roller supports for the front and rear ends of said cutter frame, a steering bar connected to said main frame, a motor shaft journaled on said main frame, a motor connected to said motor shaft, and independent clutch-controlled driving connections from said shaft to said traction roller and cutter.

4. In a power lawn mower of the class described, the combination of a main frame, a traction roller journaled therein, a cutter frame, a cutter-shaft journaled therein, an engine shaft mounted on said main frame, sprocket wheels on said shafts, a sprocket chain connecting said sprocket wheels, and frame connectors pivotally connected to said cutter frame and having longitudinally adjustable sliding joint connections to said main frame.

5. In a power lawn mower of the class described, the combination of a main frame, a traction roller journaled therein, a cutter frame, a cutter-shaft journaled therein, an engine shaft mounted on said main frame, sprocket wheels on corresponding ends of said shafts, a sprocket chain connecting said sprocket wheels, and frame connectors pivotally connected to said cutter frame on a pivotal axis substantially coincident with the axis of said cutter-shaft and having longitudinally adjustable sliding joint connections to said main frame.

6. In a power lawn mower of the class described, the combination of a main frame, a traction roller journaled therein, a cutter frame, a cutter-shaft journaled therein, an engine shaft journaled on said main frame, two pairs of fast and loose clutch members on said engine shaft, driving connections from said loose clutch members to said traction roller and cutter-shaft respectively, a steering bar connected to said main frame, handle-grips on said steering bar, and independent clutch-shifting connections extending to and operable from the inner ends of said handle-grips.

7. In a power lawn mower of the class described, the combination of a main frame, a traction roller journaled therein, a cutter frame, a cutter-shaft journaled therein, an engine shaft journaled on said main frame, a fly-wheel fast on said shaft, clutch members formed on the opposite sides of said fly-wheel, loose clutch members mounted on said shaft in coöperative relation to said fly-wheel clutch members, a spur gear driving train between one of said loose clutch members and said traction roller, a chain and sprocket driving connection between the other loose clutch member and said cutter-shaft, a steering bar connected to said main frame, handle grips on said steering bar, and independent clutch-shifting connections extending to and operable from the inner ends of said handle grips.

8. In a power lawn mower of the class described, the combination of a main frame, a traction roller journaled therein, a cutter frame, a cutter shaft journaled therein, an engine shaft journaled on said main frame, independent clutch-controlled driving connections from said engine shaft to said traction roller and cutter-shaft respectively, and an engine starting device on one end of said engine shaft.

9. In a power mower of the class described, the combination of a main frame, a traction roller journaled therein, a cutter frame, a cutter-shaft journaled therein, an engine shaft journaled in a plurality of spaced bearings on and transversely of said main frame, a fly-wheel fast on said shaft between two of said bearings, independent clutch-controlled driving connections from the opposite sides of said fly-wheel to said traction roller and cutter-shaft respectively, and an engine starting device on one end of said shaft.

10. In a power lawn mower of the class described, the combination of a frame, a motor mounted thereon, a cutter, driving connections, including a clutch, between said motor and said cutter, a steering bar connected to said frame, a handle-grip on said steering bar, an eccentric journaled on said handle-grip, and clutch-shifting connections between said eccentric and said clutch.

11. In a power lawn mower of the class described, the combination of a frame, a motor mounted thereon, a cutter, driving connections, including a clutch, between said motor and said cutter, a steering bar connected to said frame, a handle-grip on said steering bar, a clutch-shifter supporting bracket secured on said frame, a clutch-shifting lever pivoted on said bracket, an eccentric journaled on said handle-grip, an eccentric strap encircling said eccentric, and a link connection between said eccentric strap and said lever.

WARREN W. GORE.